United States Patent
Lim

(10) Patent No.: US 7,511,971 B2
(45) Date of Patent: Mar. 31, 2009

(54) CONSTANT VOLTAGE CIRCUIT FOR POWER ADAPTER

(75) Inventor: Won Chun Lim, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 238 days.

(21) Appl. No.: 11/463,737

(22) Filed: Aug. 10, 2006

(65) Prior Publication Data
US 2007/0076456 A1    Apr. 5, 2007

(30) Foreign Application Priority Data
Aug. 12, 2005    (KR) .................. 10-2005-0074450

(51) Int. Cl.
*H02M 3/335*    (2006.01)
(52) U.S. Cl. ........................ 363/16; 363/95
(58) Field of Classification Search .............. 363/95, 363/97, 21.15, 89, 98; 320/106, 110, 125, 320/152, 164
See application file for complete search history.

(56) References Cited

U.S. PATENT DOCUMENTS 6,452,820 B2 *  9/2002  Nagai et al. ................ 363/95

FOREIGN PATENT DOCUMENTS

KR    8-111974    4/1996
KR    1997-10485 A    6/1997

OTHER PUBLICATIONS

Korean Intellectual Property Office, Office Action mailed Nov. 21, 2006.

* cited by examiner

*Primary Examiner*—Rajnikant B Patel
(74) *Attorney, Agent, or Firm*—Lowe Hauptman Ham & Berner

(57) ABSTRACT

Disclosed herein is a constant voltage circuit for a power adapter which is capable of varying an output voltage with loads so as to reduce the charging time of a system battery. The constant voltage circuit includes a transformer for transforming a primary voltage based on a pulse width modulation (PWM) control into a secondary voltage according to a turn ratio of primary and secondary coils thereof, a voltage detector for detecting an output voltage from the transformer, a current detector for detecting output current which is supplied from the transformer to a load, a current/voltage converter for converting the output current detected by the current detector into a current detection voltage and outputting the converted current detection voltage to a detected voltage terminal of the voltage detector, and a comparator for comparing a voltage of the output voltage detected by the voltage detector plus the current detection voltage from the current/voltage converter with a predetermined reference voltage to output a difference voltage therebetween necessary for the PWM control of the transformer.

6 Claims, 6 Drawing Sheets

CONSTANT VOLTAGE CIRCUIT FOR POWER ADAPTER

CLAIM OF PRIORITY

This application claims the benefit of Korean Patent Application No. 2005-74450 filed on Aug. 12, 2005 in the Korean Intellectual Property Office, the disclosure of which is incorporated herein by reference.

BACKGROUND OF THE INVENTION

1. Field of the Invention

The present invention relates to a constant voltage circuit which is applied to a power supply device, such as a power adapter, and more particularly to a constant voltage circuit for a power adapter which is capable of varying an output voltage with loads so as to reduce the charging time of a system battery.

2. Description of the Related Art

In general, a power adapter, which is adapted to supply a constant voltage for charging of a battery, supplies the constant voltage irrespective of loads, as will hereinafter be described with reference to FIG. 1.

FIG. 1 is a block diagram of a conventional constant voltage circuit.

Referring to FIG. 1, the conventional constant voltage circuit comprises a transformer 10 having a primary coil and secondary coil and acting to transform a commercial alternating current (AC) voltage according to a turn ratio of the primary and secondary coils, a rectifier 20 for rectifying an output voltage from the transformer 10, a voltage detector 30 for detecting the output voltage rectified by the rectifier 20 to output a detected voltage Vd, a comparator 40 for comparing the detected voltage Vd from the voltage detector 30 with a reference voltage Vref to output a difference voltage therebetween, a signal coupler 50 for performing a coupling operation for a signal corresponding to the difference voltage from the comparator 40, and a controller 60 for controlling a primary voltage of the transformer 10 in a pulse width modulation (PWM) manner in response to an output signal from the signal coupler 50.

In this conventional constant voltage circuit, the output voltage from the transformer 10 is detected and the comparison is made between the detected voltage Vd and the internal reference voltage Vref (about 2.5V) to generate a difference voltage therebetween. The controller 60 controls a turn-on duty of a switch, for example, a field effect transistor (FET), connected to the primary coil of the transformer 10 on the basis of the difference voltage, so as to maintain the output voltage constant.

However, the above-mentioned conventional constant voltage circuit has a disadvantage in that the output voltage is controlled to be outputted constantly irrespective of loads, and more particularly even when a battery is in an uncharged state, thereby making it impossible to rapidly charge the battery.

SUMMARY OF THE INVENTION

Therefore, the present invention has been made in view of the above problem, and it is an object of the present invention to provide a constant voltage circuit for a power adapter which is capable of varying an output voltage with loads so as to reduce the charging time of a system battery.

In accordance with the present invention, the above and other objects can be accomplished by the provision of a constant voltage circuit for a power adapter comprising: a transformer having a primary coil and a secondary coil, the transformer transforming a primary voltage based on a pulse width modulation (PWM) control into a secondary voltage according to a turn ratio of the primary and secondary coils; a voltage detector for detecting an output voltage from the transformer; a current detector for detecting output current which is supplied from the transformer to a load; a current/voltage converter for converting the output current detected by the current detector into a current detection voltage and outputting the converted current detection voltage to a detected voltage terminal of the voltage detector; and a comparator for comparing a voltage of the output voltage detected by the voltage detector plus the current detection voltage from the current/voltage converter with a predetermined reference voltage to output a difference voltage therebetween necessary for the PWM control of the transformer.

The constant voltage circuit may further comprise a rectifier connected between the transformer and the load for rectifying the output voltage from the transformer.

The constant voltage circuit may further comprise: a signal coupler for outputting a signal corresponding to the difference voltage from the comparator through optical coupling; and a controller for controlling the primary voltage of the transformer in a PWM manner in response to the output signal from the signal coupler.

Preferably, the current/voltage converter comprises: an I/V conversion circuit for converting the output current detected by the current detector into the current detection voltage; and a buffer for outputting the converted current detection voltage from the I/V conversion circuit to the detected voltage terminal of the voltage detector.

The buffer may be implemented in one integrated circuit (IC) along with the comparator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
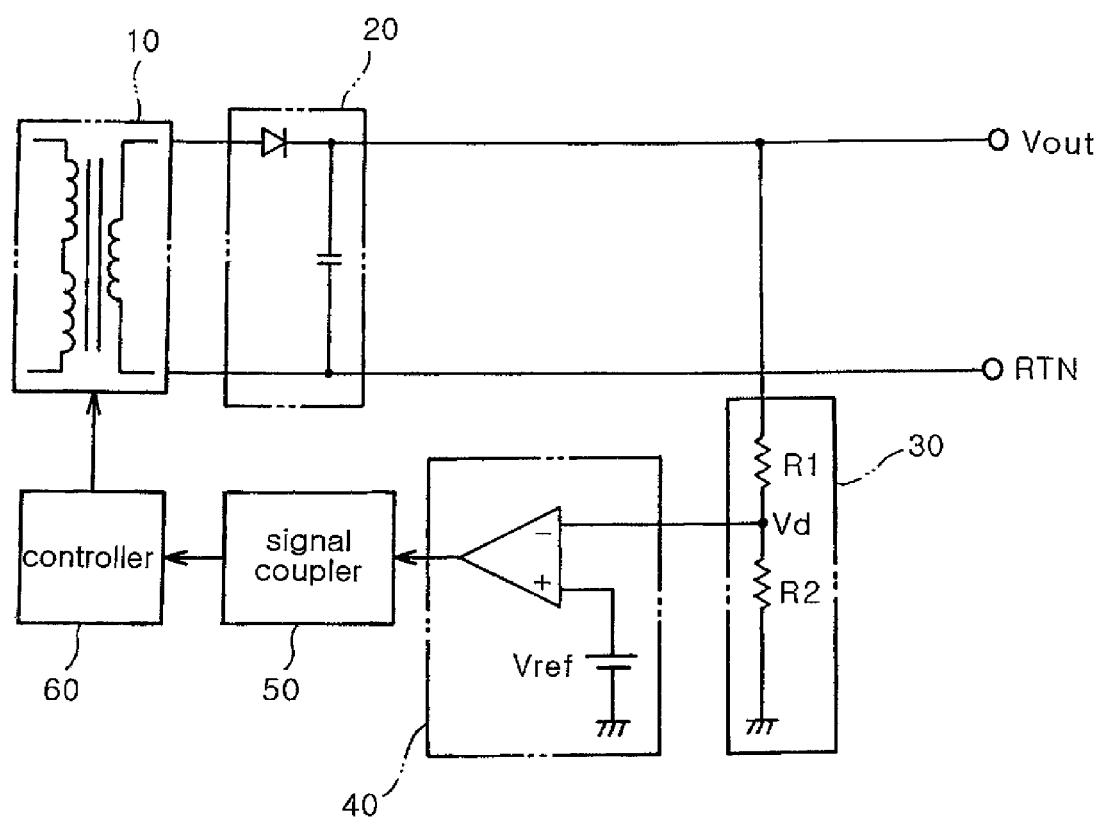
FIG. 1 is a block diagram of a conventional constant voltage circuit.

Now, preferred embodiments of the present invention will be described in detail with reference to the annexed drawings. In the drawings, the same or similar elements are denoted by the same reference numerals even though they are depicted in different drawings.

Figure 2:
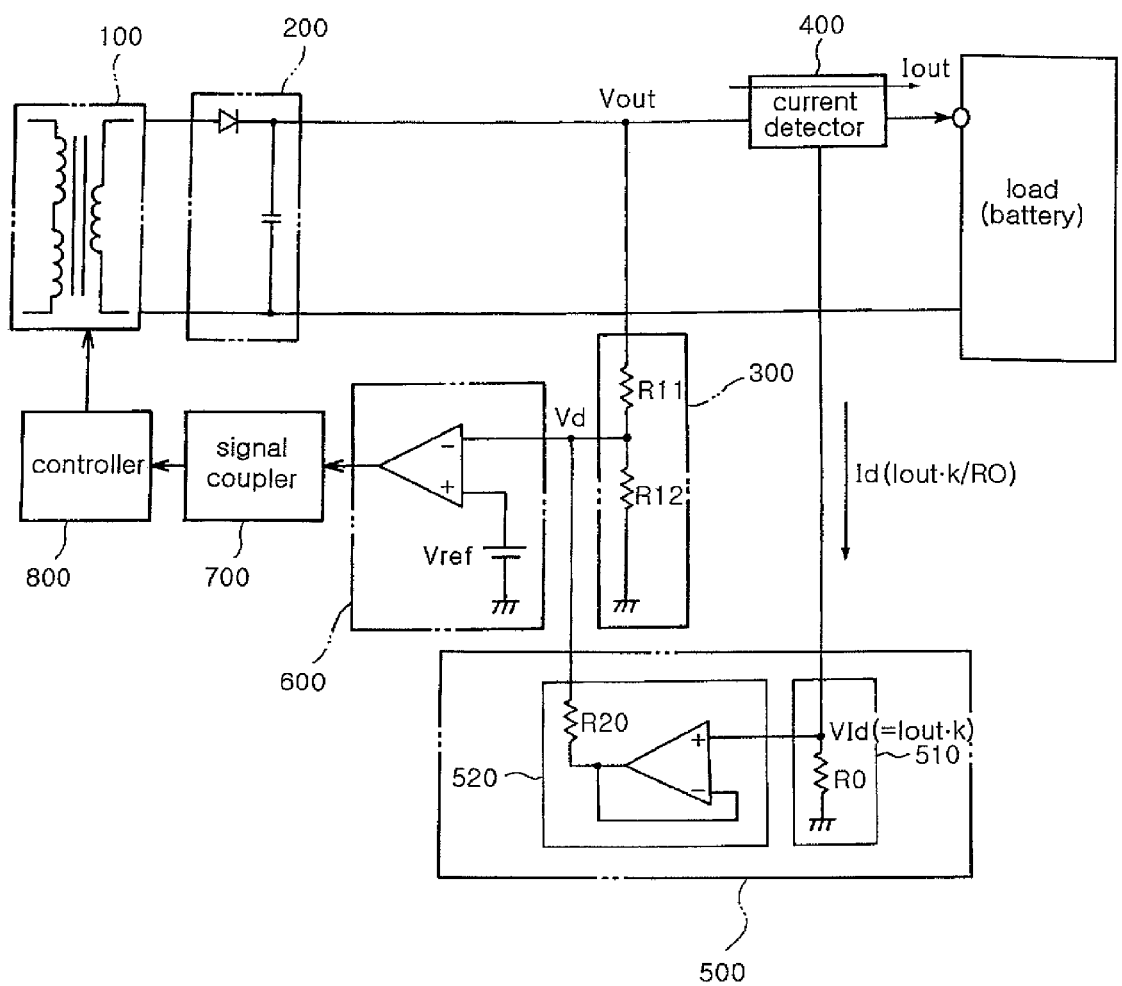
FIG. 2 is a block diagram of a constant voltage circuit according to the present invention.

FIG. 2 is a block diagram of a constant voltage circuit according to the present invention.

Referring to FIG. 2, the constant voltage circuit according to the present invention, which is typically applied to a power adapter, comprises a transformer 100 having a primary coil and secondary coil and acting to transform a primary voltage based on a PWM control into a secondary voltage according to a turn ratio of the primary and secondary coils, a voltage detector 300 for detecting an output voltage Vout from the transformer 100 to output a detected voltage Vd, a current detector 400 for detecting output current Iout which is supplied from the transformer 100 to a load to output detected current Id, a current/voltage converter 500 for converting the detected current Id from the current detector 400 into a current detection voltage VId and outputting the converted current detection voltage VId to a detected voltage Vd terminal of the voltage detector 300, and a comparator 600 for comparing a voltage Vd+VId of the detected voltage Vd from the voltage detector 300 plus the current detection voltage VId from the current/voltage converter 500 with a predetermined reference voltage Vref to output a difference voltage therebetween necessary for the PWM control of the transformer 100.

The constant voltage circuit for the power adapter further comprises a rectifier 200 connected between the transformer 100 and the load for rectifying the output voltage from the transformer 100, a signal coupler 700 for outputting a signal corresponding to the difference voltage from the comparator 600 through optical coupling, and a controller 800 for controlling the primary voltage of the transformer 100 in a PWM manner in response to the output signal from the signal coupler 700.

The current/voltage converter 500 includes an I/V conversion circuit 510 for converting the detected current Id from the current detector 400 into the current detection voltage VId, and a buffer 520 for outputting the converted current detection voltage VId from the I/V conversion circuit 510 to the detected voltage Vd terminal of the voltage detector 300.

Figure 3:
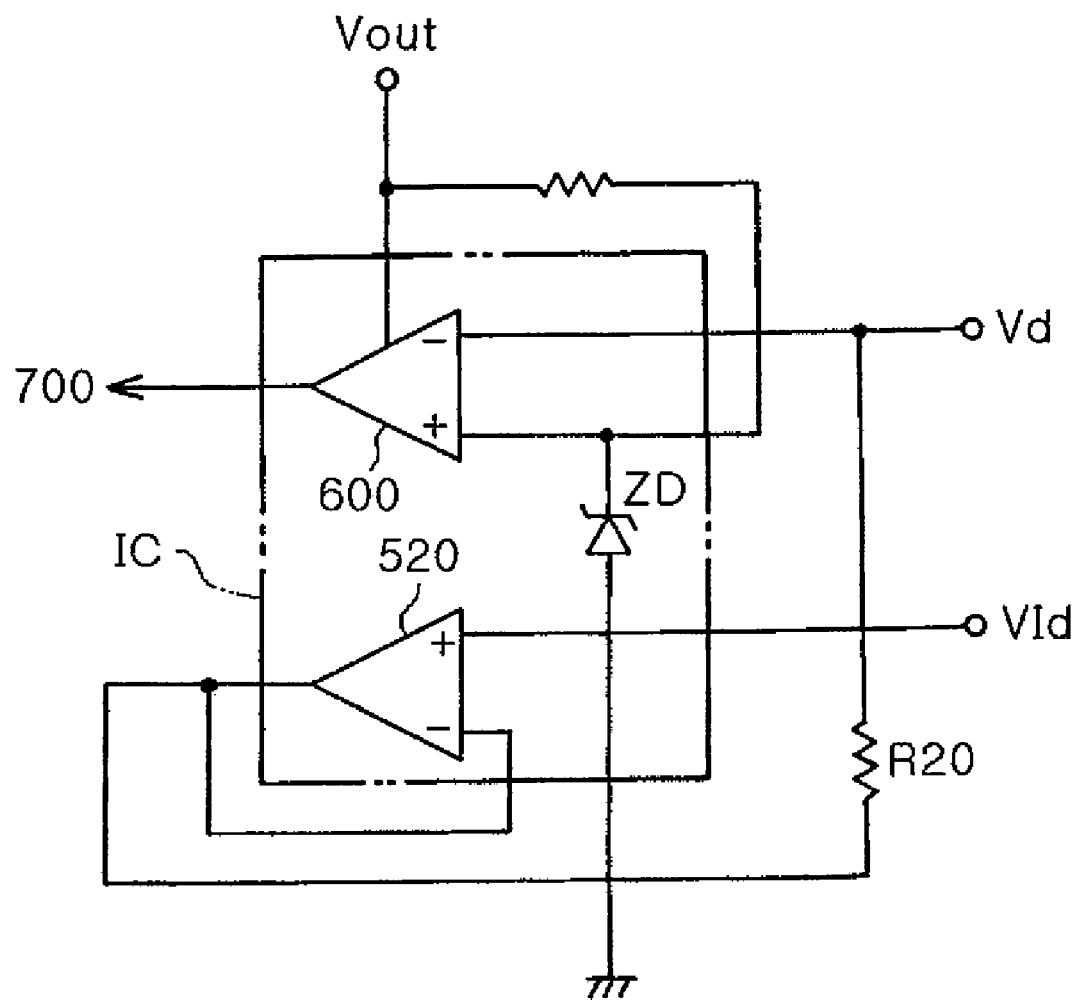
FIG. 3 is a circuit diagram of an embodiment of a comparator and buffer in FIG. 2.

FIG. 3 is a circuit diagram of an embodiment of the comparator 600 and buffer 520 in FIG. 2.

Referring to FIG. 3, the buffer 520 may be implemented in one integrated circuit (IC) along with the comparator 600. In this case, as shown in FIGS. 2 and 3, the comparator 600 has an inverting (−) input terminal connected to the detected voltage Vd terminal of the voltage detector 300, and a non-inverting (+) input terminal connected through a resistor to an operating voltage Vcc terminal and directly to the cathode terminal of a Zener diode ZD. Here, the Zener diode ZD acts to hold a constant voltage from the operating voltage Vcc terminal and supply it as the reference voltage Vref to the non-inverting input terminal of the comparator 600.

The buffer 520 has a non-inverting (+) input terminal connected to a current detection voltage VId terminal, and an inverting (−) input terminal connected to an output terminal thereof.

Figure 4:
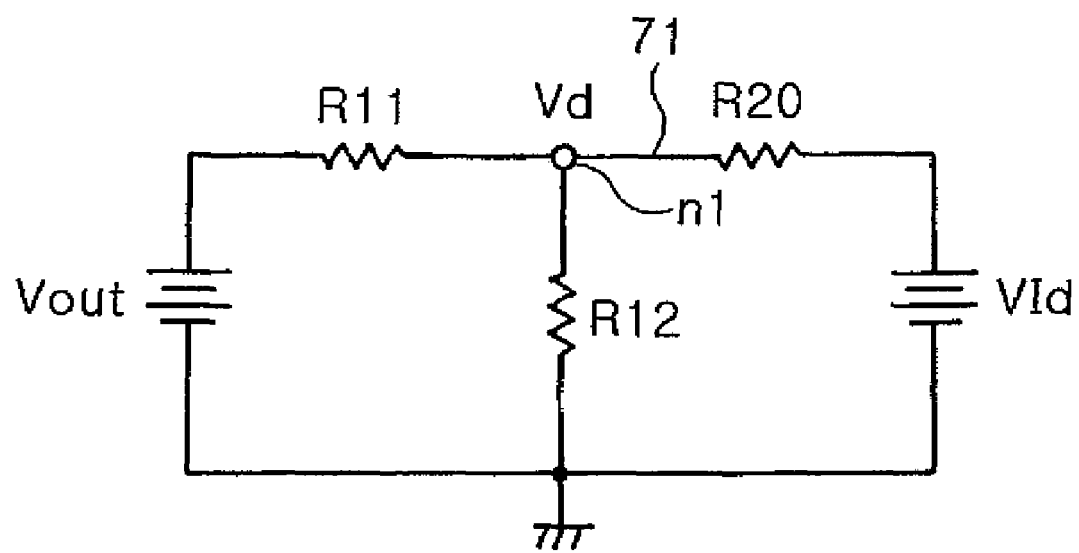
FIG. 4 is an equivalent circuit diagram of a voltage detector and current detector in FIG. 2.

FIG. 4 is an equivalent circuit diagram of the voltage detector 300 and current detector 400 in FIG. 2.

In FIG. 4, Vout is the output voltage, VId is the current detection voltage, and Vd is the detected voltage. Also, R11 and R12 are resistors of the voltage detector 300, and R20 is a resistor connected to the output terminal of the buffer 520.

Figure 5:
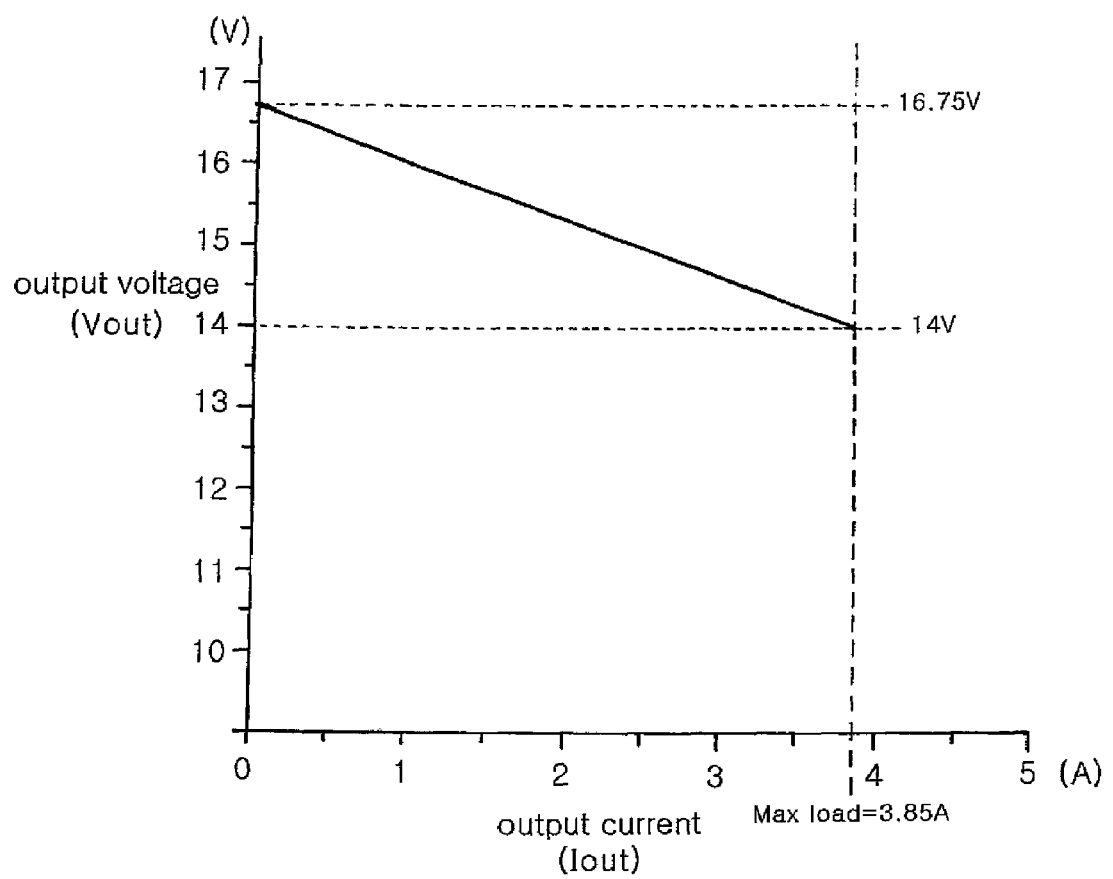
FIG. 5 is a graph illustrating an output voltage-output current characteristic of the constant voltage circuit according to the present invention.

FIG. 5 is a graph illustrating an output voltage-output current characteristic of the constant voltage circuit according to the present invention.

As can be seen from FIG. 5, as the load becomes higher, the output voltage Vout becomes lower and the output current Iout rises, and, as the load becomes lower, the output voltage Vout becomes higher and the output current Iout falls.

Figure 6:
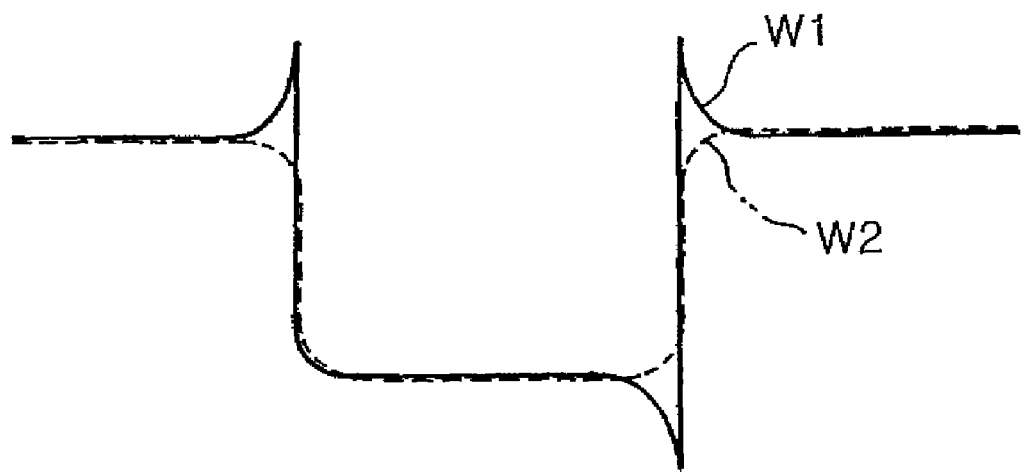
FIG. 6 is a waveform diagram illustrating a comparison between output voltage waveforms of the present and conventional constant voltage circuits.

FIG. 6 is a waveform diagram illustrating a comparison between output voltage waveforms of the present and conventional constant voltage circuits.

In FIG. 6, W1 is an output voltage waveform of the conventional constant voltage circuit, and W2 is an output voltage waveform of the present constant voltage circuit.

The operation of the constant voltage circuit for the power adapter according to the present invention will hereinafter be described in detail with reference to FIGS. 2 to 6.

First, referring to FIG. 2, the transformer 100 of the constant voltage circuit for the power adapter according to the present invention transforms a primary voltage based on the PWM control of the controller 800 into a secondary voltage according to the turn ratio of the primary and secondary coils and outputs the transformed secondary voltage to the rectifier 200. The rectifier 200, which is connected between the transformer 100 and the load, rectifies the output voltage from the transformer 100 and provides the resulting output voltage Vout. Here, the rectifier 200 may include a smoothing capacitor to smooth the output voltage Vout.

At this time, the voltage detector 300 detects the output voltage Vout from the transformer 100 and outputs the resulting detected voltage Vd to the comparator 600. Also, the current detector 400 detects output current Iout which is supplied from the transformer 100 to the load and outputs the resulting detected current Id to the current/voltage converter 500.

Then, the current/voltage converter 500 converts the detected current Id from the current detector 400 into a current detection voltage VId and outputs the converted current detection voltage VId to the detected voltage Vd terminal of the voltage detector 300.

In detail, in the current/voltage converter 500, the I/V conversion circuit 510 converts the detected current Id from the current detector 400 into the current detection voltage VId and outputs the converted current detection voltage VId to the buffer 520, and the buffer 520 outputs the converted current detection voltage VId from the I/V conversion circuit 510 to the detected voltage Vd terminal of the voltage detector 300, so as to add the current detection voltage VId to the detected voltage Vd from the voltage detector 300.

That is, by adding the voltage VId corresponding to a load state to the detected voltage Vd corresponding to the output voltage, it is possible to vary the output voltage with the load state and, in turn, control the output current through this output voltage variation.

For example, in the case where a battery is adopted as the load and the load state is a heavy load state in which a large amount of current flows to the battery under the condition that the battery is in an uncharged state, the current detection voltage VId based on the output current Iout rises, thus increasing the input voltage to the inverting (−) input terminal of the comparator 600.

Next, the comparator 600 compares a voltage Vd+VId of the detected voltage Vd from the voltage detector 300 plus the current detection voltage VId from the current/voltage converter 500 with the predetermined reference voltage Vref and outputs a difference voltage therebetween necessary for the PWM control of the transformer 100. Preferably, the comparator 600 may be implemented in one IC together with the buffer 520, as will hereinafter be described with reference to FIG. 3.

Referring to FIG. 3, the buffer 520 is implemented in one IC along with the comparator 600. The comparator 600 receives the reference voltage Vref based on the Zener diode ZD through the non-inverting (+) input terminal thereof, and the buffer 520 receives the current detection voltage VId through the non-inverting (+) input terminal thereof and outputs it through the output terminal thereof. The output terminal of the buffer 520 is connected to the inverting (−) input terminal thereof such that the current detection voltage VId is unidirectionally outputted to the detected voltage Vd terminal of the voltage detector 300.

For example, in the case where a battery is adopted as the load and the load state is a heavy load state in which a large amount of current flows to the battery under the condition that the battery is in an uncharged state, the current detection voltage VId based on the output current Iout rises, thereby increasing the input voltage to the inverting (−) input terminal of the comparator 600. As a result, a high negative voltage is outputted from the comparator 600.

The signal coupler 700 outputs a signal corresponding to the difference voltage from the comparator 600 to the controller 800 through optical coupling. To this end, the signal coupler 700 includes a photocoupler, etc. For example, the signal coupler 700 may transfer a high-level signal corresponding to the high negative voltage from the comparator 600 to the controller 800.

The controller 800 controls the primary voltage of the transformer 100 in the PWM manner in response to the output signal from the signal coupler 700. For example, when a high-level signal is inputted from the signal coupler 700, the controller 800 may determine the load state to be a heavy load state. In this case, the controller 800 lowers a PWM duty ratio so as to lower the output voltage, whereas to increase the output current. As a result, a large amount of current flows to the battery, thereby rapidly charging the battery.

Through this control process, in the case where the load is heavy, the output voltage can be controlled in such a manner that it is lowered to make the output current relatively high so as to rapidly charge the battery, as will hereinafter be described with reference to FIG. 4.

In FIG. 4, the following equation 1 can be obtained by applying Kirchhoff's Current Law (KCL) to a node n1, the following equation 2 can be obtained by arranging the equation 1 with respect to the output voltage Vout, and the following equation 3 can be obtained by substituting the current detection voltage VId with "K*Iout".

[Equation 1]
[Equation 2]
[Equation 3]

When the load is heavy, the output current Iout is raised, whereas the output voltage Vout is lowered. For example, as shown in FIG. 5, when the load is changed from 0 A to 3.85 A, the output voltage is changed from 16.75V to 14V. In this regard, the graph of FIG. 5 can be expressed in a numerical formula as in the following equation 4.

[Equation 4]

Comparing the equations 3 and 4, the following equation 5 can be obtained.

[Equation 5]

In the above equation 5, if Vd is 2.54V, the constant voltage circuit can be implemented with a circuit capable of varying the output voltage with K and R20 under the condition that the values of R11 and R12 are determined.

Meanwhile, in FIG. 6, it can be seen from W1 of the conventional constant voltage circuit that a peak voltage characteristic based on a load variation is bad. In contrast, as can be seen from W2 of the present invention, the peak voltage characteristic can be improved by the constant voltage circuit for the power adapter according to the present invention.

As apparent from the above description, the present invention provides a constant voltage circuit for a power adapter which is capable of varying an output voltage with loads so as to reduce the charging time of a system battery.

That is, for a light load, a high voltage is outputted, and, for a heavy load, a low voltage is outputted, thereby advantageously reducing the charging time of the system battery. Further, it is possible to easily vary the output voltage by sensing a load state through output current. In addition, in the adapter market, scarcity of the adapter can be secured owing to special specifications thereof. Also, because the adapter has a particularity (low response characteristic) based on the use of two operational amplifiers, it can readily meet overshoot and undershoot specifications in a load variation test.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A constant voltage circuit for a power adapter comprising:
    a transformer having a primary coil and a secondary coil, the transformer transforming a primary voltage based on a pulse width modulation (PWM) control into a secondary voltage according to a turn ratio of the primary and secondary coils;
    a voltage detector for detecting an output voltage from the transformer;
    a current detector for detecting output current which is supplied from the transformer to a load;
    a current/voltage converter for converting the output current detected by the current detector into a current detection voltage and outputting the converted current detection voltage to a detected voltage terminal of the voltage detector; and
    a comparator for comparing a voltage of the output voltage detected by the voltage detector plus the current detection voltage from the current/voltage converter with a predetermined reference voltage to output a difference voltage therebetween necessary for the PWM control of the transformer.

2. The constant voltage circuit according to claim 1, further comprising a rectifier connected between the transformer and the load for rectifying the output voltage from the transformer.

3. The constant voltage circuit according to claim 1, further comprising:
    a signal coupler for outputting a signal corresponding to the difference voltage from the comparator through optical coupling; and
    a controller for controlling the primary voltage of the transformer in a PWM manner in response to the output signal from the signal coupler.

4. The constant voltage circuit according to claim 1, wherein the current/voltage converter comprises:
    an I/V conversion circuit for converting the output current detected by the current detector into the current detection voltage; and
    a buffer for outputting the converted current detection voltage from the I/V conversion circuit to the detected voltage terminal of the voltage detector.

5. The constant voltage circuit according to claim 4, wherein the buffer is implemented in one integrated circuit (IC) along with the comparator.

6. The constant voltage circuit according to claim 5, wherein the comparator comprises:
  an inverting input terminal configured to receive the output voltage detected by the voltage detector; and
  a non-inverting input terminal configured to receive the reference voltage;

wherein the buffer comprises:
  an inverting input terminal connected to an output terminal of the buffer and connected to the inverting input terminal of the comparator; and
  a non-inverting input terminal configured to receive the current detection voltage.

* * * * *